(12) United States Patent
Kawaguchi et al.

(10) Patent No.: US 9,127,147 B2
(45) Date of Patent: *Sep. 8, 2015

(54) METHOD FOR PRODUCING THERMOPLASTIC RESIN COMPOSITIONS

(75) Inventors: Koichi Kawaguchi, Hiratsuka (JP); Yuichi Hara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 184 days.

This patent is subject to a terminal disclaimer.

(21) Appl. No.: 13/816,861

(22) PCT Filed: May 19, 2011

(86) PCT No.: PCT/JP2011/062034
§ 371 (c)(1),
(2), (4) Date: Feb. 13, 2013

(87) PCT Pub. No.: WO2012/023328
PCT Pub. Date: Feb. 23, 2012

(65) Prior Publication Data
US 2013/0144010 A1 Jun. 6, 2013

(30) Foreign Application Priority Data
Aug. 19, 2010 (JP) .................... 2010-183985

(51) Int. Cl.
| | |
|---|---|
| C08L 23/26 | (2006.01) |
| C08L 29/02 | (2006.01) |
| C08L 77/02 | (2006.01) |
| C08L 77/06 | (2006.01) |
| B60C 1/00 | (2006.01) |
| C08L 21/00 | (2006.01) |
| C08L 77/00 | (2006.01) |
| C08L 51/06 | (2006.01) |
| F16L 9/12 | (2006.01) |
| F16L 11/04 | (2006.01) |
| F16L 11/08 | (2006.01) |
| C08L 23/08 | (2006.01) |

(52) U.S. Cl.
CPC .............. C08L 29/02 (2013.01); B60C 1/0008 (2013.04); C08L 21/00 (2013.01); C08L 23/26 (2013.01); C08L 51/06 (2013.01); C08L 77/00 (2013.01); C08L 77/02 (2013.01); C08L 77/06 (2013.01); F16L 9/12 (2013.01); F16L 11/04 (2013.01); F16L 11/085 (2013.01); *C08L 23/0861* (2013.01); *C08L 23/0884* (2013.01); *F16L 2011/047* (2013.01)

(58) Field of Classification Search
CPC . B60C 1/008; C08L 123/0861; C08L 123/26; C08L 29/02
See application file for complete search history.

(56) References Cited

U.S. PATENT DOCUMENTS

| | | | |
|---|---|---|---|
| 4,749,744 A * | 6/1988 | Uejo et al. ................. 525/58 |
| 5,040,583 A | 8/1991 | Lin et al. | |
| 5,051,302 A * | 9/1991 | Tsuyguchi et al. ......... 428/32.61 |
| 6,294,602 B1 | 9/2001 | Shimo et al. | |
| 2004/0089388 A1 | 5/2004 | Fujino et al. | |
| 2009/0114328 A1 | 5/2009 | Takahashi et al. | |
| 2009/0308517 A1 | 12/2009 | Nohara et al. | |
| 2010/0112257 A1 | 5/2010 | Morooka | |
| 2010/0147432 A1* | 6/2010 | Morooka ................. 152/511 |
| 2011/0305863 A1 | 12/2011 | Morooka | |
| 2012/0214943 A1* | 8/2012 | Sato et al. ................. 525/57 |
| 2013/0065001 A1 | 3/2013 | Kani | |

FOREIGN PATENT DOCUMENTS

| | | |
|---|---|---|
| JP | 01-314164 A | 12/1989 |
| JP | 4-370130 A | 12/1992 |
| JP | 6-040207 A | 2/1994 |
| JP | 2002-052904 A | 2/2002 |
| JP | 2004-176048 A | 6/2004 |
| JP | 2005-054195 A | 3/2005 |
| JP | 2008-024217 A | 2/2008 |
| JP | 2009-132379 A | 6/2009 |
| JP | 2010-132850 A | 6/2010 |
| JP | 2012-031405 A | 2/2012 |
| WO | WO-2007/081323 A1 | 7/2007 |
| WO | WO-2010/110077 A1 | 9/2010 |

OTHER PUBLICATIONS

English translation of JPA04370130 (2014).*
Japanese Office Action issued Jul. 23, 2014 in counterpart JP Appln. No. 2010-183985.

* cited by examiner

*Primary Examiner* — Mark Kaucher
(74) *Attorney, Agent, or Firm* — Novak Druce Connolly Bove + Quigg LLP

(57) ABSTRACT

Provided is a method for producing thermoplastic resin compositions, the method comprising the step of melt-blending (A) a thermoplastic elastomer composition, obtained by dispersing (ii) an acid anhydride-modified or epoxy-modified rubber in (i) an ethylene-vinyl alcohol copolymer, with (B-1) a resin composition comprising at least one resin selected from (i) unmodified polyamide resins and modified polyamide resins or (B-2) a thermoplastic elastomer composition obtained by dispersing (ii) an acid anhydride-modified or epoxy-modified rubber in (i) at least one resin selected from unmodified polyamide resins and modified polyamide resins. Said thermoplastic elastomer composition has excellent gas barrier properties and the decrease in gas barrier properties associated with fatigue has been reduced.

20 Claims, No Drawings

METHOD FOR PRODUCING THERMOPLASTIC RESIN COMPOSITIONS

CROSS REFERENCE TO RELATED APPLICATIONS

This application is a National Phase filing under 35 U.S.C. §371 of PCT/JP2011/062034 filed on May 19, 20111; and this application claims priority to Application No. 2010-183985 filed in Japan on Aug. 19, 2010; the entire contents of all are hereby incorporated by reference.

TECHNICAL FIELD

The present invention relates to a method for preparing a thermoplastic resin composition, and more specifically, it relates to a method for preparing a thermoplastic resin composition having excellent gas barrier properties and a reduced decrease in gas barrier properties due to fatigue, and manufactured articles obtained from the thermoplastic resin composition prepared by this method.

BACKGROUND ART

Weight reduction in gas permeation preventing structures used in applications which require the prevention of gas permeation (for example, pneumatic tires, gas or fluid transporting hoses, etc.) has heretofore been desired. For example, although a rubber composition comprising as a main component a butyl-based rubber such as butyl rubber and halogenated butyl rubbers is used in an inner liner which is provided on the inner surface of a pneumatic tire as a gas permeation preventing layer to retain the inner pressure of the pneumatic tire, rubber compositions comprising a butyl-based rubber as a main component have low gas barrier properties, and therefore when an inner liner is formed using such a rubber composition, it has been necessary to thicken the thickness of the inner liner. Therefore, the use of a rubber composition comprising a butyl-based rubber as a main component has been problematic in weight reduction in tires in order to improve the fuel efficiency of automobiles.

Providing a film of ethylene-vinyl alcohol copolymer (EVOH) which is known to have excellent gas barrier properties, laminated with an elastic surface layer or adhesive layer, on the inner surface of a tire, in order to achieve improvement in the inner pressure-retaining ability and weight reduction of a pneumatic tire, is proposed in, for example, Patent Documents 1 and 2. However, when an EVOH layer is used as a layer which constitutes an inner liner for pneumatic tire, since EVOH has a significantly higher elastic modulus compared to rubbers usually used in pneumatic tires, repeated flexure and tensile deformations subjected to the EVOH layer during the running of the tire result in a reduction in gas barrier properties of the EVOH layer, and as a result, lead to a reduction in the inner pressure-retaining ability of the tire. As a means for solving this problem, Patent Document 3 discloses a technique relating to the use of a resin composition comprising 60 to 99 wt % of an ethylene-vinyl alcohol copolymer having an ethylene content of 20 to 70 mol % and a saponification degree of 85% or more and 1 to 40 wt % of a hydrophobic plasticizer in an inner liner of a pneumatic tire. In addition, Patent Document 4 discloses a technique relating to the use of a modified ethylene-vinyl alcohol copolymer obtained by reacting 100 parts by weight of an ethylene-vinyl alcohol copolymer having an ethylene content of 25 to 50 mol % with an epoxy compound in an amount of 1 to 50 parts by weight with respect to 100 parts by weight of the ethylene-vinyl alcohol copolymer in an inner liner of a pneumatic tire. Moreover, Patent Document 5 discloses a technique relating to the use of a tire inner liner comprising a phase of a resin composition comprising a matrix of an ethylene-vinyl alcohol copolymer modified with the epoxy compound and a soft resin which has a Young's modulus lower than that of the modified ethylene-vinyl alcohol copolymer at 23° C. and is dispersed in the modified ethylene-vinyl alcohol copolymer.

However, the inner liners for pneumatic tire obtained by the techniques as described above are not sufficient in inner pressure-retaining ability after fatigue (after tire running), and therefore there is still a need to further improve the fatigue resistance in order to reduce the decrease in gas barrier properties due to fatigue. Also in applications such as gas or liquid transportation hoses, there is a need to achieve weight reduction and to reduce the decrease in gas barrier properties due to fatigue.

PRIOR ART DOCUMENTS

Patent Documents

Patent Document 1: Japanese Unexamined Patent Publication No. 1-314164
Patent Document 2: Japanese Unexamined Patent Publication No. 6-40207
Patent Document 3: Japanese Unexamined Patent Publication No. 2002-52904
Patent Document 4: Japanese Unexamined Patent Publication No. 2004-176048
Patent Document 5: Japanese Unexamined Patent Publication No. 2008-24217

SUMMARY OF THE INVENTION

Problems to be Solved by the Invention

Therefore, the object of the present invention is to provide a method for preparing a thermoplastic resin composition having excellent gas barrier properties and a reduced decrease in gas barrier properties due to fatigue.

Means for Solving the Problems

The inventors have found that a thermoplastic resin composition having excellent gas barrier properties and the decrease in gas barrier properties of which, due to fatigue resulting from stress deformation such as repeated flexural deformation and tensil deformation, is reduced can be obtained by melt-mixing a thermoplastic elastomer composition obtained by dispersing an acid anhydride-modified or epoxy-modified rubber in an ethylene-vinyl alcohol copolymer with a resin composition comprising at least one resin selected from unmodified polyamide resins and modified polyamide resins, or a thermoplastic elastomer composition comprising at least one resin selected from unmodified polyamide resins and modified polyamide resins and an acid anhydride-modified or epoxy-modified rubber dispersed in the at least one resin, and as a result have completed the present invention.

According to the present invention, a method for preparing a thermoplastic resin composition is provided, wherein the method comprising melt-mixing (A) a thermoplastic elastomer composition comprising (i) an ethylene-vinyl alcohol copolymer and (ii) an acid anhydride-modified or epoxy-modified rubber dispersed therein, with (B-1) (i) a resin composition comprising at least one resin selected from unmodified polyamide resins and modified polyamide resins, or (B-2) a thermoplastic elastomer composition comprising (i) at least one resin selected from unmodified polyamide resins and modified polyamide resins, and (ii) an acid anhydride-modified or epoxy-modified rubber dispersed therein.

According to the present invention, various manufactured articles manufactured from the thermoplastic resin composition obtained from such a method, for example, pneumatic tires using a film of the thermoplastic resin composition in an inner liner thereof, and gas barrier products such as hoses using a film of the thermoplastic resin composition in a gas barrier layer, are also provided.

MODE FOR CARRYING OUT THE INVENTION

Thermoplastic elastomer composition (A) used in the method for preparing the thermoplastic resin composition of the present invention can be obtained by dispersing into (i) an ethylene-vinyl alcohol copolymer (ii) an acid anhydride-modified or epoxy-modified rubber. The ethylene-vinyl alcohol copolymer of component (i) can be prepared by a well-known method, for example, by polymerizing ethylene and vinyl acetate to prepare ethylene-vinyl acetate copolymer (EVA), and hydrolyzing the resulting EVA. Examples of commercially available EVOHs that can be used in the present invention include Soarnol H4815B (ethylene unit content: 48 mol %), Soarnol H4412B (ethylene unit content: 44 mol %), Soarnol E3808B (ethylene unit content: 38 mol %), and Soarnol D2908 (ethylene unit content: 29 mol %) from The Nippon Synthetic Chemical Industry Co., Ltd., and EVAL-G156B (ethylene unit content: 48 mol %), EVAL-E171B (ethylene unit content: 44 mol %), EVAL-H171B (ethylene unit content: 38 mol %), EVAL-F171B (ethylene unit content: 32 mol %), and EVAL-L171B (ethylene unit content: 27 mol %) from Kuraray Co., Ltd., etc. Single EVOH may be used, or 2 or more EVOHs may be used in combination.

In thermoplastic elastomer composition (A), acid anhydride-modified or epoxy-modified copolymer (component (ii)) which is dispersed in ethylene-vinyl alcohol copolymer (i) is a rubber having an acid anhydride group or epoxy-containing group at side chains or terminal ends of the rubber molecule. Modified rubber (ii) exhibits compatibility to ethylene-vinyl alcohol copolymer (i) by having an acid anhydride group or epoxy-containing group, and therefore modified rubber (ii) can be dispersed in ethylene-vinyl alcohol copolymer (i). Examples of the acid anhydride group which may present in modified rubber (ii) include, for example, carboxylic acid anhydride groups such as maleic acid anhydride group, etc., and examples of the epoxy-containing group include an epoxyethyl group, glycidyl group, glycidyl ether group, etc.

Modified rubber (ii) can be prepared by a well-known method, and the modified rubber having an acid anhydride group can be prepared by, for example, reacting a rubber with an acid anhydride and a peroxide. Examples of commercially available acid anhydride-modified rubber include maleic anhydride-modified ethylene-propylene copolymer (TAFMER™ MP-0620), maleic anhydride-modified ethylene-butene copolymer (TAFMER™ MP-7020) from Mitsui Chemicals, Inc., etc. The epoxy group-containing modified rubber can be prepared by, for example, copolymerizing glycidyl methacrylate with a rubber. Examples of commercially available epoxy-modified rubbers include epoxy-modified ethylene-methyl acrylate copolymer (Esprene™ EMA2752), etc. Preferred examples of modified rubber (ii) include maleic anhydride-modified ethylene-propylene copolymer, maleic anhydride ethylene-butene copolymer, and epoxy-modified ethylene-methyl acrylate copolymer. In particular, a preferred modified rubber (ii) is ethylene-α-olefin copolymer which is graft-modified with an acid anhydride group, and examples of the commercially available products thereof include maleic anhydride-modified ethylene-propylene copolymer (TAFMER™ MP-0620), maleic anhydride-modified ethylene-butene copolymer (TAFMER™ MP-7020) from Mitsui Chemicals, Inc., as described above. One of the above modified rubbers may be used, or two or more of the above modified rubbers may be used in combination.

In thermoplastic elastomer composition (A), EVOH (i) which is thermoplastic forms a continuous phase (matrix phase) with respect to modified rubber (ii) which forms a dispersed phase, and therefore thermoplastic elastomer composition (A) exhibits thermoplastic properties and is capable of being shaped in the same manner as conventional thermoplastic resins. The amount of modified rubber (ii) in thermoplastic elastomer composition (A) is typically about 40 to about 180 parts by weight, and preferably about 50 to about 160 parts by weight, with respect to 100 parts by weight of EVOH (i). If the amount of acid anhydride-modified or epoxy-modified rubber (ii) is less than 40 parts by weight with respect to 100 parts by weight of EVOH (i), sufficient durability cannot be achieved, and if the amount of acid anhydride-modified or epoxy-modified rubber (ii) is more than 180 parts by weight, modified rubber (ii) forms a co-continuous phase with EVOH (i), or modified rubber (ii) forms a continuous phase and EVOH forms a dispersed phase, sufficient durability and processability cannot be achieved, and it is difficult to melt-mix them with resin composition (B-1) or thermoplastic elastomer composition (B-2). In thermoplastic elastomer composition (A), modified rubber (ii) is typically dispersed in EVOH (i) in the form of particles having an average particle diameter of about 1 to about 5 μm.

Optional additives, for example, reinforcing agents (such as carbon black, silica, calcium carbonate, zinc oxide), compatibilizers, antioxidants, crosslinking agents or vulcanizing agents, crosslinking or vulcanization accelerators, plasticizers, fillers, coloring agents, processing aids, etc., may be optionally used in usual amounts in the preparation of thermoplastic elastomer composition (A), in so far as the object of the present invention is not diminished. For example, a crosslinking agent (or vulcanizing agent) may be added to EVOH (i) together with modified rubber (ii) to dynamically crosslink modified rubber (ii). Although modified rubber (ii) which constitutes thermoplastic elastomer composition (A) may be dynamically crosslinked during melt-mixing with resin composition (B-1) or thermoplastic elastomer composition (B-2), it is preferred to use a crosslinking agent, since thermoplastic elastomer composition (A) comprising modified rubber (ii), the dispersed state of which is fixed, can be obtained by dynamically crosslinking modified rubber (ii) in the preparation of thermoplastic elastomer composition (A).

Crosslinking agents that can be used in the preparation of thermoplastic elastomer composition (A) include amine compounds, peroxide compounds, compounds having a hydroxyl group, and polyfunctional amine compounds are particularly preferred. Polyfunctional amine compounds include 3,3'-diaminodiphenylsulfone, 4,4'-diaminodiphenylsulfone, N-(1,3-dimethylbutyl)-N'-phenyl-p-phenylenediamine, meta-phenylenediamine, 1,3-bis(3-aminophenoxy)benzene, etc., and 1,3-bis(3-aminophenoxy)benzene is preferred in view of cost, safety, improvement in low-temperature durability. When a crosslinking agent is used in the preparation of thermoplastic elastomer composition (A), the amount of the crosslinking agent is preferably from about 0.1 to about 5 parts by weight, and more preferably from 0.5 to about 3 parts by weight, with respect to 100 parts by weight of modified rubber (ii) which constitutes thermoplastic elastomer composition (A). Too low an amount of the crosslinking agent leads to insufficient dynamic crosslinking, and the fine dispersion of modified rubber (ii) cannot be maintained. Conversely, too much of a crosslinking agent leads to reduction in durability, and therefore is not preferred.

Thermoplastic elastomer composition (A) can be prepared by melt-kneading EVOH (i), modified rubber (ii), and optional additives using a well-known kneading machine such as a kneader, Banbury mixer, single screw kneading extruder, twin-screw kneading extruder, etc., and the melt-kneading is preferably carried out by using a twin-screw kneading extruder, in view of its high productivity. Although the melt-kneading conditions depend on the types and amounts of EVOH (i), modified rubber (ii), and optional additives used, the melt-kneading temperature is equal to or higher than the melting point of EVOH (i), and preferably is about 20° C. higher than the melting point of EVOH (i). The melt-kneading time period is typically from about 1 to about 10 minutes, and preferably from about 2 to about 5 minutes. Modified rubber (ii) can be dynamically crosslinked in EVOH (i) by adding a crosslinking agent as an optional additive and setting the melt-kneading temperature equal to or higher than the initiation temperature of crosslinking by the crosslinking agent.

Resin composition (B-1) or thermoplastic elastomer composition (B-2) which is melt-mixed with thermoplastic elastomer composition (A) comprises at least one resin selected from (i) unmodified polyamide resins and modified polyamide resins, and in the case of thermoplastic elastomer composition (B-2), it further comprises (ii) an acid anhydride-modified or epoxy-modified rubber. Examples of the unmodified polyamide resin which can form component (i) of resin compositions (B-1) and (B-2) include Nylon 6 (N6), Nylon 66 (N66), Nylon 46 (N46), Nylon 11 (N11), Nylon 12 (N12), Nylon 610 (N610), Nylon 612 (N612), Nylon 6/66 copolymer (N6/66), Nylon 666 (N666), Nylon 6/66/610 copolymer (N6/66/610), Nylon MXD6, Nylon 6T, Nylon 6/6T copolymer, Nylon 66/PP copolymer, and Nylon 66/PPS copolymer. Preferred examples of the unmodified polyamide resin include Nylon 6, Nylon 66, and Nylon 666. The modified polyamide resin can be obtained by reacting an unmodified polyamide resin as described above with a modifying agent such as mono-functional epoxy compounds, isocyanate group-containing compounds, acid anhydride group-containing compounds, halogenated alkyl group-containing compounds, etc. In view of the reactivity with the terminal amino groups of the polyamide resin, mono-functional epoxy compounds are preferred as the modifying agent. It is preferable that a part or all of the amino groups (terminal amino groups) existing at least at the molecular terminals of the polyamide resin is or are modified. Preferred examples of the modified polyamide resin includes Nylon 6, Nylon 66, Nylon 666, etc., in which a part or all of, and preferably all of the terminal amino groups are capped with a mono-functional epoxy compound. When a polyamide resin having a terminal amino group capped with a mono-functional epoxy compound, isocyanate group-containing compound, etc., is used, even if the modified polyamide resin is highly loaded with acid anhydride-modified or epoxy-modified rubber (ii), it is possible to maintain the flowability and therefore to carry out film formation. Accordingly, when a modified polyamide resin is highly loaded with acid anhydride-modified or epoxy-modified rubber (ii), the resin which constitutes component (i) of thermoplastic elastomer composition (B-2) is preferably a terminal-capped polyamide resin. One or more polyamide resins may be used, or one or more modified polyamide resins may be used, or one or more polyamide resins and one or more modified polyamide resins may be used in combination.

Examples of the monofunctional epoxy compound include ethylene oxide, epoxypropane, 1,2-epoxybutane, 2,3-epoxybutane, 3-methyl-1,2-epoxybutane, 1,2-epoxypentane, 4-methyl-1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 5-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-propyl-2,3-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 6-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-1-hexanol, 3,4-epoxy-5-methyl-2-hexanol, 3,4-epoxy-5,5-dimethyl-2-hexanol, 3,4-epoxy-3-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-3-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-5-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycyclododecane, 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecane, 1,2-epoxycyclododecene, 1-butoxy-2,3-epoxypropane, 1-allyloxy-2,3-epoxypropane, polyethyleneglycol) butyl glycidyl ether, 2-ethylhexyl glycidyl ether, phenyl glycidyl ether, and p-sec-butylphenyl glycidyl ether. In view of the compatibility with a polyamide resin, epoxy compounds having 3 to 20, preferably 3 to 13 carbon atoms and having either or both of an ether group and a hydroxyl group are particularly preferable.

The modified polyamide resin can be obtained by melt-blending a unmodified polyamide resin with a modifying agent in an amount typically from about 0.05 to about 5 parts by weight, and preferably from about 1 to about 3 parts by weight with respect to 100 parts by weight of the unmodified polyamide resin at or higher than the melting point of the unmodified polyamide resin, depending on the types of the starting materials, the unmodified polyamide resin and the modifying agent. The method of melt-blending a unmodified polyamide resin and a modifying agent is not particularly limited, and is carried out by, for example, melt-blending a unmodified polyamide resin and a modifying agent in a twin-screw kneading extruder at or higher that the melting point of the unmodified polyamide resin, and preferably about 20° C. higher than the melting point of the unmodified polyamide resin for typically from about 1 to about 10 minutes, and preferably from about 2 to about 5 minutes.

Component (ii) of thermoplastic elastomer composition (B-2), i.e., an acid anhydride-modified or epoxy-modified rubber may be as described above for acid anhydride-modified or epoxy-modified rubber (ii) of thermoplastic elastomer composition (A). However, the type of acid anhydride-modified or epoxy-modified rubber (ii) of thermoplastic elastomer composition (B-2) does not have to be identical to acid anhydride-modified or epoxy-modified rubber (ii) of thermoplastic elastomer composition (A) and may be different from acid anhydride-modified or epoxy-modified rubber (ii) of thermoplastic elastomer composition (A).

In thermoplastic elastomer composition (B-2), since at least one resin (i) selected from thermoplastic unmodified polyamide resins and modified polyamide resins that are thermoplastic forms a continuous phase (matrix phase) with respect to modified rubber (ii) which forms a dispersed phase, thermoplastic elastomer composition (B-2) exhibits thermoplastic properties, and is capable of being subjected to molding processes in the same manner as for usual thermoplastic resins. The amount of modified rubber (ii) in thermoplastic elastomer composition (B-2) is typically from about 40 to about 180 parts by weight, and preferably from about 60 to about 160 parts by weight with respect to 100 parts by weight of at least one resin (i). When the amount of acid anhydride-modified or epoxy-modified rubber (ii) is less than 40 parts by weight with respect to 100 parts by weight of at least one resin (i), sufficient durability cannot be achieved, and when the amount of acid anhydride-modified or epoxy-modified rubber (i) is more than 180 parts by weight, modified rubber (ii) forms a co-continuous phase with at least one resin (i), or modified rubber (ii) forms a continuous phase and at least one resin (i) forms a dispersed phase, and therefore sufficient durability and processability cannot be achieved. Then, subsequent melt-mixing with thermoplastic elastomer composition (A) become difficult. In thermoplastic elastomer composition (B-2), modified rubber (ii) is typically dispersed in the form of particles having an average particle diameter of from about 1 to about 5 μm in at least one resin (i).

In addition to at least one resin (i) selected from unmodified polyamide resins and modified polyamide resins as well as modified rubber (ii), optional additives, such as reinforcing agents (such as carbon black, silica), compatibilizers, antioxidants, crosslinking agents or vulcanizing agents, crosslinking or vulcanization accelerators, plasticizers, fillers, coloring agents, processing aids, etc., may be optionally used in common amounts in the preparation of thermoplastic elastomer composition (B-2), as long as the object of the present invention is not diminished. For example, a crosslinking agent (or vulcanizing agent) may be added to at least one resin (i) together with modified rubber (ii) to dynamically crosslink modified rubber (ii). Although Modified rubber (ii) which constitutes thermoplastic elastomer composition (B-2) may be dynamically crosslinked during melt-mixing with thermoplastic elastomer composition (A), it is preferred to use a crosslinking agent, since thermoplastic elastomer composition (A) comprising modified rubber (ii), the dispersed state of which is fixed, can be obtained by dynamically crosslinking modified rubber (ii) in the preparation of thermoplastic elastomer composition (B-2).

Crosslinking agents that can be used in the preparation of thermoplastic elastomer composition (B-2) include those crosslinking agents as described above for acid anhydride-modified or epoxy-modified rubber (ii) of thermoplastic elastomer composition (A). When a crosslinking agent is used in the preparation of thermoplastic elastomer composition (B-2), the amount of the crosslinking agent is preferably from about 0.1 to about 2 parts by weight, and more preferably from about 0.5 to about 1 part by weight with respect to 100 parts by weight of modified rubber (ii) which constitutes thermoplastic elastomer composition (B-2). Too low an amount of the crosslinking agent leads to insufficient dynamic crosslinking, and the fine dispersion of modified rubber (ii) cannot be maintained. Conversely, too much of a crosslinking agent leads to reduction in durability, and therefore is not preferred.

Thermoplastic elastomer composition (B-2) can be prepared by melt-kneading at least one resin (i) selected from unmodified polyamide resins and modified polyamide resins, modified rubber (ii), and optional additives using a well-known kneading machine such as a kneader, Banbury mixer, single-screw kneading extruder, twin-screw kneading extruder, etc., and the melt-kneading is preferably carried out by using a twin-screw kneading extruder, in view of its high productivity. Although the melt-kneading conditions depend on the types and amounts of at least one resin (i) selected from unmodified polyamide resins and modified polyamide resins, modified rubber (ii), and optional additives used, the melt-kneading temperature is equal to or higher than the melting point of at least one resin (i), and preferably is about 20° C. higher than the melting point of at least one resin (i). The melt-kneading time period is typically from about 1 to about 10 minutes, and preferably from about 2 to about 5 minutes. Modified rubber (ii) can be dynamically crosslinked in at least one resin (i) by adding a crosslinking agent as an optional additive and setting the melt-kneading temperature to the initiation temperature of crosslinking by the crosslinking agent.

As described above, thermoplastic elastomer composition (A) and resin composition (B-1) or thermoplastic elastomer composition (B-2), separately prepared from each other, are preferably melt-mixed at a weight ratio from 5:95 to 95:5, and more preferably at a weight ratio from 5:95 to 40:60 or from 60:40 to 95:5. When the weight ratio of thermoplastic elastomer composition (A) to resin composition (B-1) or thermoplastic elastomer composition (B-2) is in the range of from 5:95 to 40:60, a thermoplastic resin composition in which thermoplastic elastomer composition (A) is dispersed in resin composition (B-1) or thermoplastic elastomer composition (B-2) can be obtained by melt-mixing elastomer composition (A) with resin composition (B-1) or thermoplastic elastomer composition (B-2). When the weight ratio of thermoplastic elastomer composition (A) to resin composition (B-1) or thermoplastic elastomer composition (B-2) is in the range of from 60:40 to 95:5, a thermoplastic resin composition in which resin composition (B-1) or thermoplastic elastomer composition (B-2) is dispersed in thermoplastic elastomer composition (A) can be obtained. In both cases of the thermoplastic resin composition in which thermoplastic elastomer composition (A) is dispersed in resin composition (B-1) or thermoplastic elastomer composition (B-2) and the thermoplastic resin composition in which resin composition (B-1) or thermoplastic elastomer composition (B-2) is dispersed in thermoplastic elastomer composition (A), the stress concentration at the interface between thermoplastic elastomer composition (A) phase (continuous phase or dispersed phase) and resin composition (B-1) or thermoplastic elastomer composition (B-2) phase (dispersed phase or continuous phase) can be prevented, and therefore the decrease in gas barrier properties due to fatigue can be reduced.

Moreover, the total amount of the acid anhydride-modified or epoxy-modified rubber in the thermoplastic resin composition of the present invention is preferably in the range of from about 70 to about 180 parts by weight with respect to 100 parts by weight of the total amount of the ethylene-vinyl alcohol copolymer and the at least one resin selected from unmodified polyamide resins and modified polyamide resins. If the total amount of the acid anhydride-modified or epoxy-modified rubber is less than 70 parts by weight with respect to 100 parts by weight of the total amount of the ethylene-vinyl alcohol copolymer and the at least one resin selected from unmodified polyamide resins and modified polyamide resins, sufficient durability cannot be achieved, and if the total amount of the acid anhydride-modified or epoxy-modified rubber is more than 180 parts by weight with respect to 100 parts by weight of the total amount of the ethylene-vinyl alcohol copolymer and the at least one resin selected from unmodified polyamide resins and modified polyamide resins, sufficient processability cannot be achieved.

The melt-mixing of thermoplastic elastomer composition (A) and resin composition (B-1) or thermoplastic elastomer composition (B-2) can be carried out by using a well-known kneading machine such as a kneader, Banbury mixer, single screw kneading extruder, twin-screw kneading extruder, etc., and is preferably carried out by using a twin-screw kneading extruder, in view of its high productivity. To promote the melt-mixing of thermoplastic elastomer composition (A) and resin composition (B-1) or thermoplastic elastomer composition (B-2), it is preferred to shape thermoplastic elastomer composition (A) and resin composition (B-1) or thermoplastic elastomer composition (B-2) into the form of pellet, granule, etc., with an equipment such as a pelletizer prior to melt-mixing thermoplastic elastomer composition (A) with resin composition (B-1) or thermoplastic elastomer composition (B-2). The melt-mixing conditions depend on the types and amounts of the above-described essential components and optional additives of thermoplastic elastomer composition (A) and resin composition (B-1) or thermoplastic elastomer composition (B-2), and the melt-mixing temperature is equal to or higher than the melting point of EVOH (i) which constitutes thermoplastic elastomer composition (A) and is equal to or higher than the melting point of the unmodified polyamide resins and modified polyamide resins which constitute resin composition (B-1) or thermoplastic elastomer composition (B-2), and preferably the melt-mixing temperature is 20° C. to 30° C. higher than the higher of the melting point of EVOH (i) which constitutes thermoplastic elastomer composition (A) and the melting point of at least one resin (i) selected from the unmodified polyamide resins and modified polyamide resins which constitutes resin composition (B-1) or thermoplastic elastomer composition (B-2). The melt-mixing time is typically from about 1 to about 10 minutes, and preferably from about 2 to about 5 minutes. Modified rubber (ii) can be dynamically crosslinked in at least one resin (i) by adding as an optional additive a crosslinking agent and setting the melt-kneading temperature equal to or higher than the initiation temperature of the crosslinking by the crosslinking agent.

The melt-kneaded thermoplastic resin composition may then be extruded in a molten state, for example, from a die attached to the outlet port of the twin-screw kneading extruder using a common method into a shape such as a film form, a sheet form, or a tube form, etc., or into a strand form, and pelletized with a resin pelletizer, and subsequently the resulting pellets are formed into a desired form such as a film, sheet, or tube by a common resin forming method such as inflation, calendar, extrusion forming, etc., depending on the intended application.

The thermoplastic resin composition of the present invention can be used in various applications, such as pneumatic tires, gas or liquid transportation hoses, pneumatic ship fenders, etc. The thermoplastic resin composition of the present invention has excellent air barrier properties as well as excellent low temperature durability and resistance to flexural fatigue, and therefore can be suitably used in applications such as inner liners for pneumatic tires, hoses, pneumatic ship fenders, etc.

Any conventional method may be used for manufacturing a pneumatic tire in which a film of the thermoplastic resin composition of the present invention is used in an inner liner. For example, the thermoplastic resin composition of the present invention is extruded into a film having a predetermined width and thickness, and the resulting film is laminated onto a tire molding drum in a cylindrical form, tire members such as a carcass layer, a belt layer, a tread layer, etc., that are commonly used in tire production are sequentially laminated thereon, and the resulting green tire is removed from the drum. Then, the green tire is vulcanized in accordance with a conventional procedure to manufacture a desired pneumatic tire using the film of the thermoplastic resin composition of the present invention in an inner liner.

Any conventional method may be used as a method for producing a hose using a film of the thermoplastic resin composition of the present invention in a gas barrier layer. For example, the thermoplastic resin composition of the present invention is extruded on a mandrel precoated with a releasing agent, by an extruder in a crosshead extrusion manner to form an inner tube, and reinforcing yarns or reinforcing steel wires are braided on the inner tube using a braiding machine to form a reinforcing layer on the inner tube, and a thermoplastic resin is further extruded on the reinforcing layer to form an outer tube. A layer of another thermoplastic resin and/or adhesive may be provided between the inner tube and the reinforcing layer and between the reinforcing layer and outer tube, as necessary. Finally, the mandrel is withdrawn to obtain a hose.

EXAMPLES

The present invention will be further explained by referring to the following examples and comparative examples, and it should be understood that the scope of the present invention is not limited by these examples.

(1) Starting Materials

Modified polyamide resin: a modified Nylon obtained by modifying 100 parts by weight of Nylon 666 (UBE Nylon 5033B manufactured by Ube Industries, Ltd) with 2 parts by weight of p-sec-butylphenylglycidylether.

Ethylene-vinyl alcohol copolymer (EVOH): Soarnol H4412B manufactured by The Nippon Synthetic Chemical Industries Co. Ltd.

Modified rubber: Maleic anhydride-modified ethylene-butene copolymer (Tafmer MH-7020 manufactured by Mitsui Chemicals Inc.)

Crosslinking agent: 3,3'-diaminodiphenylsulfone (3,3'-DAS from Konishi Chemical Industry Co., Ltd.)

(2) Preparations of Thermoplastic Resin Compositions

Comparative Examples 1 to 4

The modified polyamide resin, EVOH, modified rubber, and crosslinking agent at a weight ratio as shown in Table 1 were charged into a cylinder of a twin-screw kneading extruder (manufactured by The Japan Steel Works, Ltd.) through a material feeding port, and were transferred to a kneading zone set at a temperature of 220° C. and a residence time of from about 2 to 8 minutes to melt-knead them, and the resulting kneaded mixture was extruded into the form of strand from the die attached to the discharge port. The resulting extrudate in the form of a strand was pelletized with a resin pelletizer to obtain pellets of the thermoplastic resin compositions.

Comparative examples 1 to 4 are examples illustrating preparations of thermoplastic resin compositions by melt-kneading the modified polyamide resin, EVOH, modified rubber, and crosslinking agent in one step.

Examples 1 to 4

(a) Preparations of EVOH-Containing Compositions

The EVOH, modified rubber, and crosslinking agent at a weight ratio shown in Table 2 were charged into a cylinder of a twin-screw kneading extruder (manufactured by The Japan Steel Works, Ltd.) through a material feeding port, and were transferred to a kneading zone set at a temperature of 220° C. and a residence time of from 2 to 8 minutes to melt-knead them, and the resulting molten kneaded mixture was extruded into the form of strand from the die attached to the discharge port. The resulting extrudate in the form of strand was pelletized with a resin pelletizer to obtain pellets of an EVOH-containing composition corresponding to the thermoplastic elastomer compositions (A).

(b) Preparations of Polyamide-Containing Compositions

The modified polyamide resin, modified rubber, and crosslinking agent at a weight ratio shown in Table 3 were charged into a cylinder of a twin-screw kneading extruder (manufactured by The Japan Steel Works, Ltd.) through a material feeding port, and were transferred to a kneading zone set at a temperature of 220° C. and a residence time of from 2 to 8 minutes to melt-knead them, and the resulting molten kneaded mixture was extruded into the form of a strand from the die attached to the discharge port. The resulting extrudate in the form of strand was pelletized with a resin pelletizer to obtain pellets of a polyamide-containing composition corresponding to the thermoplastic elastomer compositions (B-2).

(c) Melt-Mixing of EVOH-Containing Composition and Polyamide-Containing Composition The pellets of the EVOH-containing composition and the pellets of the polyamide-containing composition obtained in the manner as described above were charged into a cylinder of a twin-screw kneading extruder (manufactured by The Japan Steel Works, Ltd.) through a material feeding port, and were transferred to a kneading zone set at a temperature of 220° C. and a residence time of from 2 to 8 minutes to melt-mix them, and the resulting molten mixture was extruded into the form of strand from the die attached to the discharge port. The resulting extrudate in the form of a strand was pelletized with a resin pelletizer to obtain pellets of the thermoplastic resin composition of the present invention.

(3) Evaluation Method for the Thermoplastic Resin Composition

The thermoplastic resin compositions of Comparative examples 1 to 4 and Examples 1 to 4 were evaluated for gas permeability and the rate of change in gas permeability after fatigue according to the following test methods.

(a) Gas Permeability

The thermoplastic resin compositions in the form of pellets were formed into a film having an average thickness of 0.15 mm by using a 40 mm$\phi$ single-screw extruder (Pla Giken Co., Ltd.) equipped with a 400 mm wide T dice under extrusion conditions in which extrusion temperatures of C1/C2/C3/C4/die=200/210/230/235/235° C., a chill roll temperature of 50° C., and a withdrawing speed of 3 m/min. Next, specimens having a size of 20 cm length and 20 cm width were prepared from the resulting films, and were dried at 150° C. for 3 hours or more, and the films of the thermoplastic resin compositions were measured for gas permeability in accordance with JIS K7126-1, "Gas permeability test method for plastic film and sheeting (differential pressure method)" using air as a test gas at a test temperature of 30° C.

The test result in Example 1 was represented by an index number assuming that the gas permeability of Comparative Example 1 to be 100, the test result in Example 2 was represented by an index number assuming that the gas permeability in Comparative Example 2 to be 100, the test result in Example 3 was represented by an index number assuming that the gas permeability in Comparative Example 3 to be 100, and the test result in Example 4 was represented by an index number assuming that the gas permeability in Comparative Example 4 to be 100

(b) Rate of Change in Gas Permeability after Fatigue

The starting materials other than the vulcanizing agent in the formulations shown in Table 5 were kneaded with a 1.7 liter Banbury mixer at 70° C. for 5 minutes to obtain a masterbatch, and thereafter the masterbatch was kneaded with the vulcanizing agent by using an 8 inch roll, and was shaped into a film having a thickness of 0.5 mm. The resulting unvulcanized rubber composition film was laminated on a film of the thermoplastic resin composition prepared in the same manner as that described for the test method of "(a) Gas Permeability" and was vulcanized at 180° C. for 10 minutes. Specimens having a size of 11 cm length and 11 cm width were prepared from the resulting laminate, and were measured for gas permeability in the same way as that described for the test method of "(a) Gas Permeability". After the measurement of gas permeability, the specimens were subjected to fatigue by stretching repeatedly 1,000,000 times under conditions of an extension ratio of 20%, 400 times per minute at room temperature. The specimens after fatigue were measured for gas permeability in the same manner as described for the test method of "(a) Gas Permeability" and were expressed as a percentage (%) with respect to the gas permeability before fatigue.

The test results are shown in Tables 1 and 4 below.

TABLE 1

Formulations (parts by weight) and test results of thermoplastic resin compositions of Comparative Examples 1 to 4

|  | Comparative Example 1 | Comparative Example 2 | Comparative Example 3 | Comparative Example 4 |
|---|---|---|---|---|
| Starting Materials |  |  |  |  |
| EVOH | 8.6 | 25.7 | 61.0 | 78.4 |
| Modified polyamide resin | 78.4 | 61.0 | 25.7 | 8.6 |
| Modified rubber | 100.0 | 100.0 | 100.0 | 100.0 |
| Crosslinking agent | 2.0 | 2.0 | 2.0 | 2.0 |
| Modified polyamide resin: EVOH weight ratio | 90:10 | 70:30 | 30:70 | 10:90 |
| Test Results |  |  |  |  |
| Gas Permeability | 100 | 100 | 100 | 100 |
| Rate of change in gas permeability after fatigue (%) | 130 | 140 | 160 | 180 |

TABLE 2

Formulations (parts by weight) of EVOH-containing compositions of Examples 1 to 4

|  | Example 1 | Example 2 | Example 3 | Example 4 |
|---|---|---|---|---|
| Starting Materials for EVOH-containing composition |  |  |  |  |
| EVOH | 87.0 | 87.0 | 87.0 | 87.0 |
| Modified rubber | 100.0 | 100.0 | 100.0 | 100.0 |
| Crosslinking agent | 2.0 | 2.0 | 2.0 | 2.0 |
| Total amount (parts by weight) | 189.0 | 189.0 | 189.0 | 189.0 |

TABLE 3

Formulations (parts by weight) of polyamide-containing compositions of Examples 1 to 4

|  | Example 1 | Example 2 | Example 3 | Example 4 |
|---|---|---|---|---|
| Starting Materials for polyamide-containing composition |  |  |  |  |
| Modified polyamide resin | 87.0 | 87.0 | 87.0 | 87.0 |
| Modified rubber | 100.0 | 100.0 | 100.0 | 100.0 |
| Crosslinking agent | 2.0 | 2.0 | 2.0 | 2.0 |
| Total amount (parts by weight) | 189.0 | 189.0 | 189.0 | 189.0 |

TABLE 4

Formulations (parts by weight) and test results of thermoplastic resin compositions of Examples 1 to 4

|  | Example 1 | Example 2 | Example 3 | Example 4 |
|---|---|---|---|---|
| EVOH-containing composition | 18.9 | 56.6 | 132.1 | 170.1 |
| Polyamide-containing composition | 170.1 | 132.1 | 56.6 | 18.9 |
| Polyamide-containing composition:EVOH-containing composition weight ratio | 90:10 | 70:30 | 30:70 | 10:90 |
| Test Results |  |  |  |  |
| Gas Permeability | 100 (based on Comparative Example 1) | 100 (based on Comparative Example 1) | 100 (based on Comparative Example 1) | 100 (based on Comparative Example 1) |
| Rate of change in gas permeability after fatigue (%) | 120 | 130 | 140 | 150 |

TABLE 5

Formulation of unvulcanized rubber composition

| Starting Materials | Amounts (parts by weight) |
|---|---|
| Halogenated butyl rubber[1] | 100.0 |
| GPF carbon black[2] | 30.0 |
| Wet process silica[3] | 20.0 |
| Aromatic oil[4] | 7.5 |
| Zinc oxide[5] | 3.0 |
| Stearic acid[6] | 1.0 |
| Surfur[7] | 1.0 |
| Vulcanization Accelerator[8] | 1.5 |
| Total | 164.0 |

Footnote:
[1]BROMOBUTYL X2 manufactured by LANXESS Rubber
[2]HTC#G manufactured by NSCC Carbon Co., Ltd.
[3]Zeosil ™ 165GR manufactured by Rhodia
[4]Extract No. 4S manufactured by Showa Shell Petroleum Co., Ltd.
[5]Zinc oxide of JIS grade 3 manufactured by Seido Chemical Industry Co., Ltd.
[6]Beads Stearic Acid YR manufactured by NOF Corporation
[7]GOLDEN FLOWER sulfur powder 150 mesh manufactured by Tsurumi Chemical Industry Co., Ltd.
[8]Nocceler DM manufactured by Ouchi Shinko Chemical Industrial Co., Ltd.

It is clear from the comparison of the test results in Table 1 with the test results in Table 4 that the thermoplastic resin composition prepared in accordance with the present invention has excellent gas barrier properties and a low decrease in gas barrier properties due to fatigue.

The invention claimed is:

1. A method for preparing a thermoplastic resin composition comprising melt-mixing
   (A) a thermoplastic elastomer composition comprising (i) an ethylene-vinyl alcohol copolymer and (ii) an acid anhydride-modified or epoxy-modified rubber dispersed in said ethylene-vinyl alcohol copolymer (i), and (iii) 0.1 to 5 parts by weight of a first crosslinking agent with respect to 100 parts by weight of modified rubber (ii) which constitutes thermoplastic elastomer composition (A), with
   (B-2) a thermoplastic elastomer composition comprising (i) at least one resin selected from unmodified polyamide resins and modified polyamide resins, and (ii) an acid anhydride-modified or epoxy-modified rubber dispersed in said at least one resin (i), and (iii) 0.1 to 2 parts by weight of a second crosslinking agent with respect to 100 parts by weight of modified rubber (ii) which constitutes thermoplastic elastomer composition (B-2).

2. The method according to claim 1, wherein the weight ratio of thermoplastic elastomer composition (A) to thermoplastic elastomer composition (B-2) is 5:95 to 95:5.

3. The method according to claim 1, wherein, in the thermoplastic resin composition, the weight ratio of thermoplastic elastomer composition (A) to thermoplastic elastomer composition (B-2) is from 5:95 to 40:60 and thermoplastic elastomer composition (A) is dispersed in thermoplastic elastomer composition (B-2), or the weight ratio of thermoplastic elastomer composition (A) to thermoplastic elastomer composition (B-2) is from 60:40 to 95:5 and the thermoplastic elastomer composition (B-2) is dispersed in thermoplastic elastomer composition (A).

4. The method according to claim 1, wherein at least one resin (i) of thermoplastic elastomer composition (B-2) are selected from the group consisting of Nylon 6, Nylon 66, and nylon 666; and Nylon 6, Nylon 66, and Nylon 666, in which a terminal amino group is capped with a mono-functional epoxy compound.

5. The method according to claim 1, wherein acid anhydride-modified or epoxy-modified rubber (ii) of thermoplastic elastomer composition (A) and acid anhydride-modified or epoxy-modified rubber (ii) of thermoplastic elastomer composition (B) are each independently selected from the group consisting of acid anhydride-modified products and epoxy-modified products of ethylene-α-olefin copolymers and their derivatives, acid anhydride-modified products and epoxy-modified products of ethylene-unsaturated carboxylic acid copolymers and their derivatives, and combinations thereof.

6. The method according to claim 1, wherein the amount of acid anhydride-modified or epoxy-modified rubber (ii) of thermoplastic elastomer composition (A) is from 40 to 180 parts by weight with respect to 100 parts by weight of ethylene-vinyl alcohol copolymer (i) of thermoplastic elastomer composition (A).

7. The method according to claim 1, wherein the amount of acid anhydride-modified or epoxy-modified rubber (ii) of thermoplastic elastomer composition (B-2) is from 40 to 180 parts by weight with respect to 100 parts by weight of polyamide resin or terminal-modified polyamide resin (i) of thermoplastic elastomer composition (B-2).

8. The method according to claim 1, wherein the total amount of the acid anhydride-modified or epoxy-modified rubber in the thermoplastic resin composition is from 70 to 180 parts by weight with respect to 100 parts by weight of the total of ethylene-vinyl alcohol copolymer and the at least one resin selected from unmodified polyamide resins and modified polyamide resins.

9. The method according to claim 2, wherein at least one resin (i) of thermoplastic elastomer composition (B-2) are selected from the group consisting of Nylon 6, Nylon 66, and nylon 666; and Nylon 6, Nylon 66, and Nylon 666, in which a terminal amino group is capped with a mono-functional epoxy compound.

10. The method according to claim 3, wherein at least one resin (i) of thermoplastic elastomer composition (B-2) are selected from the group consisting of Nylon 6, Nylon 66, and nylon 666; and Nylon 6, Nylon 66, and Nylon 666, in which a terminal amino group is capped with a mono-functional epoxy compound.

11. The method according to claim 2, wherein acid anhydride-modified or epoxy-modified rubber (ii) of thermoplastic elastomer composition (A) and acid anhydride-modified or epoxy-modified rubber (ii) of thermoplastic elastomer composition (B) are each independently selected from the group consisting of acid anhydride-modified products and epoxy-modified products of ethylene-α-olefin copolymers and their derivatives, acid anhydride-modified products and epoxy-modified products of ethylene-unsaturated carboxylic acid copolymers and their derivatives, and combinations thereof.

12. The method according to claim 3, wherein acid anhydride-modified or epoxy-modified rubber (ii) of thermoplastic elastomer composition (A) and acid anhydride-modified or epoxy-modified rubber (ii) of thermoplastic elastomer composition (B) are each independently selected from the group consisting of acid anhydride-modified products and epoxy-modified products of ethylene-α-olefin copolymers and their derivatives, acid anhydride-modified products and epoxy-modified products of ethylene-unsaturated carboxylic acid copolymers and their derivatives, and combinations thereof.

13. The method according to claim 4, wherein acid anhydride-modified or epoxy-modified rubber (ii) of thermoplastic elastomer composition (A) and acid anhydride-modified or epoxy-modified rubber (ii) of thermoplastic elastomer composition (B) are each independently selected from the group consisting of acid anhydride-modified products and epoxy-modified products of ethylene-α-olefin copolymers and their derivatives, acid anhydride-modified products and epoxy-modified products of ethylene-unsaturated carboxylic acid copolymers and their derivatives, and combinations thereof.

14. A method for preparing a thermoplastic resin composition comprising melt-mixing
(A) a thermoplastic elastomer composition comprising (i) an ethylene-vinyl alcohol copolymer and (ii) an acid anhydride-modified or epoxy-modified rubber dispersed in said ethylene-vinyl alcohol copolymer (i), wherein the acid anhydride-modified or epoxy-modified rubber (ii) is dynamically crosslinked in the presence of (iii) 0.1 to 5 parts by weight of a first crosslinking agent with respect to 100 parts by weight of modified rubber (ii) which constitutes thermoplastic elastomer composition (A), with
(B-2) a thermoplastic elastomer composition comprising (i) at least one resin selected from unmodified polyamide resins and modified polyamide resins, and (ii) an acid anhydride-modified or epoxy-modified rubber dispersed in said at least one resin (i), wherein the acid anhydride-modified or epoxy modified rubber is dynamically crosslinked in the presence of (iii) 0.1 to 2 parts by weight of a second crosslinking agent with respect to 100 parts by weight of modified rubber (ii) which constitutes thermoplastic elastomer composition (B-2).

15. The method according to claim 14, wherein the weight ratio of thermoplastic elastomer composition (A) to thermoplastic elastomer composition (B-2) is 5:95 to 95:5.

16. The method according to claim 14, wherein, in the thermoplastic resin composition, the weight ratio of thermoplastic elastomer composition (A) to thermoplastic elastomer composition (B-2) is from 5:95 to 40:60 and thermoplastic elastomer composition (A) is dispersed in thermoplastic elastomer composition (B-2), or the weight ratio of thermoplastic elastomer composition (A) to thermoplastic elastomer composition (B-2) is from 60:40 to 95:5 and thermoplastic elastomer composition (B-2) is dispersed in thermoplastic elastomer composition (A).

17. The method according to claim 14, wherein at least one resin (i) of thermoplastic elastomer composition (B-2) is selected from the group consisting of Nylon 6, Nylon 66, and nylon 666; and Nylon 6, Nylon 66, and Nylon 666, in which a terminal amino group is capped with a mono-functional epoxy compound.

18. The method according to claim 14, wherein acid anhydride-modified or epoxy-modified rubber (ii) of thermoplastic elastomer composition (A) and acid anhydride-modified or epoxy-modified rubber (ii) of thermoplastic elastomer composition (B) are each independently selected from the group consisting of acid anhydride-modified products and epoxy-modified products of ethylene-α-olefin copolymers and their derivatives, acid anhydride-modified products and epoxy-modified products of ethylene-unsaturated carboxylic acid copolymers and their derivatives, and combinations thereof.

19. The method according to claim 14, wherein the amount of acid anhydride-modified or epoxy-modified rubber (ii) of thermoplastic elastomer composition (A) is from 40 to 180 parts by weight with respect to 100 parts by weight of ethylene-vinyl alcohol copolymer (i) of thermoplastic elastomer composition (A).

20. The method according to claim 14, wherein the amount of acid anhydride-modified or epoxy-modified rubber (ii) of thermoplastic elastomer composition (B-2) is from 40 to 180 parts by weight with respect to 100 parts by weight of polyamide resin or terminal-modified polyamide resin (i) of thermoplastic elastomer composition (B-2).

* * * * *